(12) United States Patent
Hicham

(10) Patent No.: US 11,695,313 B2
(45) Date of Patent: Jul. 4, 2023

(54) MAGNETIC ATTRACTION AND REPULSION DEVICE FOR DRIVING AXES IN ROTATION

(71) Applicant: Taoufik Hicham, Marrakesh (MA)

(72) Inventor: Taoufik Hicham, Marrakesh (MA)

(*) Notice: Subject to any disclaimer, the term of this patent is extended or adjusted under 35 U.S.C. 154(b) by 60 days.

(21) Appl. No.: 17/423,504

(22) PCT Filed: Oct. 20, 2020

(86) PCT No.: PCT/MA2020/000008
§ 371 (c)(1),
(2) Date: Jul. 16, 2021

(87) PCT Pub. No.: WO2021/107750
PCT Pub. Date: Jun. 3, 2021

(65) Prior Publication Data
US 2022/0077754 A1 Mar. 10, 2022

(30) Foreign Application Priority Data
Nov. 26, 2019 (MA) .......................................... 47546

(51) Int. Cl.
*H02K 7/116* (2006.01)
*H02K 21/00* (2006.01)

(52) U.S. Cl.
CPC ............ *H02K 21/00* (2013.01); *H02K 7/116* (2013.01)

(58) Field of Classification Search
CPC ........ H02K 7/116; H02K 21/00; H02K 21/14; H02K 53/00
See application file for complete search history.

(56) References Cited

U.S. PATENT DOCUMENTS

| 2002/0158531 A1 | 10/2002 | Aritaka |
| 2018/0269758 A1 | 9/2018 | You et al. |

FOREIGN PATENT DOCUMENTS

| CA | 2038006 A1 | 9/1992 | |
| CA | 2935747 A1 | 1/2018 | |
| EP | 3410583 A1 * | 12/2018 | ............. H02K 53/00 |
| EP | 3410583 A1 | 12/2018 | |
| FR | 2493065 A1 | 4/1982 | |
| WO | 9010337 A1 | 9/1990 | |
| WO | 9403962 A1 | 2/1994 | |

* cited by examiner

*Primary Examiner* — Ramon M Barrera
(74) *Attorney, Agent, or Firm* — Bayramoglu Law Offices LLC

(57) ABSTRACT

The magnetic attraction and repulsion device for driving axes in rotation is a system for producing motive force released through one or two coaxial outlets. The magnetic attraction and repulsion device includes a centrally positioned axis carrying one or various permanent magnets and at least one synchronization toothed gear to form the rotor. The system also consists of other peripheral axes around the rotor, each carrying at least one permanent magnet and at least one synchronization toothed gear. The transmission toothed gears are connected by meshing the synchronization toothed gears of the rotor and of the peripheral axes. All the axes should be in stainless steel. The continuous activity of the system is achieved by the fact that one or various magnetic poles of permanent magnets carried by the rotor axis is directed in alternation between two or four magnetic poles of permanent magnets carried by the peripheral axes.

9 Claims, 5 Drawing Sheets

MAGNETIC ATTRACTION AND REPULSION DEVICE FOR DRIVING AXES IN ROTATION

CROSS REFERENCE TO THE RELATED APPLICATIONS

This application is the national phase entry of International Application No. PCT/MA2020/000008, filed on Oct. 20, 2020, which is based upon and claims priority to Moroccan Patent Application No. MA 47546, filed on Nov. 26, 2019, the entire contents of which are incorporated herein by reference.

TECHNICAL FIELD

The present invention relates to the magnetic attraction and repulsion device for driving axes in rotation, particularly is a new system for producing motive force released through one or two coaxial outlets.

BACKGROUND

The energy resources used for the movement of any machines are expensive and renewable energies fail to meet the relentless needs of demand. To achieve the goal of attenuating the energy needed for the movement, the magnetic attraction and repulsion device for driving axes in rotation is needed as a new alternative system.

SUMMARY

Magnetic attraction and repulsion device for driving axes in rotation comprises an engine frame, supports, stability rod, transmission toothed gears, magnetic field synchronization toothed gears, a number of permanent magnets units, carried respectively by the rotor axis and its peripheral axes, the control means, the latters are external to the object of the invention and are needed along the circumference of the engine frame, whereby the activity of the system can be realized from one or various magnetic poles of permanent magnets carried by the rotor axis, provided that this or these magnetic poles are directed respectively in alternation between two magnetic poles of permanent magnets carried by the peripheral axes or between four magnetic poles, including two magnetic poles caused by the through bore of the said permanent magnets carried by the peripheral axes, in order to produce mechanical work by the magnetic attraction and repulsion.

Further, the magnetic fields of the poles of one and of various permanent magnets carried by the peripheral axes exert a force of repulsion and attraction on one or more magnetic fields of the poles of permanent magnets carried by the rotor axis so as to alternate and produce a variation of the magnetic flux.

Further, the involvement of synchronization toothed gears must ensure to the magnetic poles of permanent magnets carried by the rotor axis a speed of rotation preferably at least three times higher than the speed of the magnetic poles of any permanent magnet carried by a peripheral axis.

Further, the diameter of the synchronization toothed gear carried by the rotor axis be preferably at least three times smaller than the diameter circumscribed by one or various permanent magnets carried by the rotor axis.

Further, the diameter circumscribed by one or various permanent magnets carried by the axis of the rotor be preferably at least three times greater than the diameter of a permanent magnet carried by a peripheral axis.

Further, the number of tours per minute of a permanent magnet carried by a peripheral axis can be greater than or equal to that of a permanent magnet carried by the rotor axis.

Further, the device allows one or various permanent magnets carried by the axis of the rotor and those carried by the peripheral axes, the whole of which is synchronized by toothed gears within the engine frame, to take another geometric shape.

Further, the device uses control means (external to the subject of the invention), such as an electromagnetic stator, or rings composed by other permanent magnets with a magnetic field allowing it to control the slowing down, acceleration or resting of its synchronized rotation.

Further, the device can produce a movement to a vehicle, a navigating craft, a propeller aircraft, an electric generator, or a device to which the system can be applied.

DETAILED DESCRIPTION OF THE EMBODIMENTS

Figure 1:
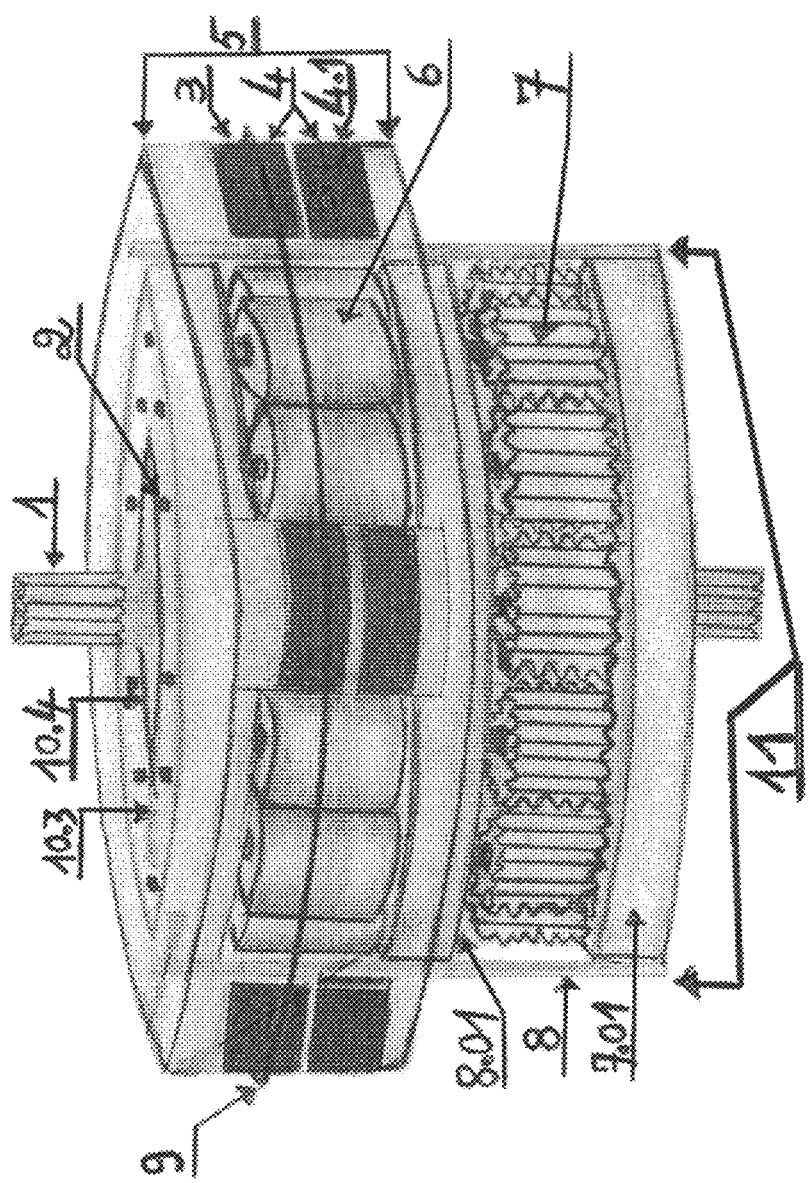
FIG. 1 is the illustration of the device composed of toothed gears and a set of permanent magnets in alignment one by one around the rotor:
1: outlet;
2: stability rod preferably in stainless steel;
3: movable permanent magnet;
4: permanent magnets;
4.1: fixed permanent magnet;
5: rings, one fixed and the other movable (control means);
6: permanent magnet carried by a peripheral axis;
7: toothed gears;
7.01: support;
8: engine frame;
8.01: support;
9: acceleration cable;
10.3: support;
10.4: support;
11: system (engine).

The magnetic attraction and repulsion device for driving axes in rotation is a new system which relates to an engine (FIG. 1, (11)), intended to produce a driving force, in order to reduce the dependence on the energy related to the needs of our current machines.

The magnetic attraction and repulsion device for driving axes in rotation serves several advantages.

First, it allows the system to generate a driving force to match any need.

Second, it provides a system that takes into account ease of manufacture, low cost production, reliability in use and wide application scope.

It also offers a system that takes into account various means of adaptation. It can be coupled, for example, with a system or with a gearbox of a rolling vehicle or with various accessories such as alternators, air conditioners and pumps. It can also operate an electric generator, in atmospheric space or outside the Earth's atmosphere.

The magnetic attraction and repulsion device for driving axes in rotation is a system designed to provide driving force through one or two coaxial outlets.

Figure 2:
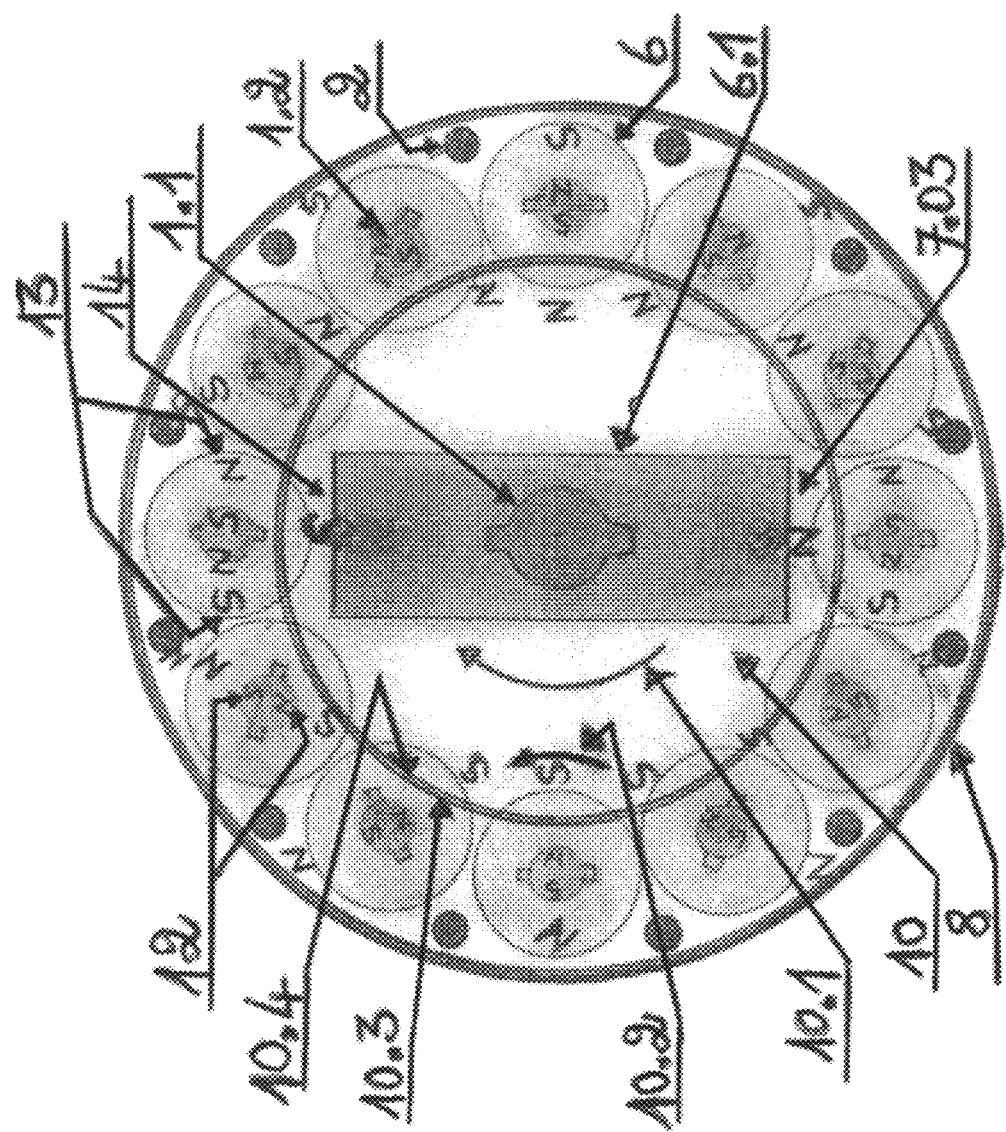
FIG. 2 is the illustration of the system (engine), the permanent magnets carried by the peripheral axes and the permanent magnet carried by the rotor axis:
1.1: rotor axis preferably in stainless steel;
1.2: peripheral axis preferably in stainless steel;
2: stability rod preferably in stainless steel;
6: permanent magnets carried by the peripheral axes;
6.1: permanent magnet carried by the rotor axis;
7.01: support;
7.03: the magnetic pole of a permanent magnet carried by the rotor axis (North);
8: engine frame;
8.01: support;
10: rotor;
10.1: direction of rotation of the rotor;
10.2: direction of rotation of a permanent magnet carried by a peripheral axis;
10.3: support;
10.4: support;
12: two magnetic poles cause by the through bore of a permanent magnet;
13: two magnetic poles of the permanent magnet carried by a peripheral axis;
14: the magnetic pole of a permanent magnet carried by the rotor axis (South);
S: magnetic South Pole;
N: magnetic North Pole.
Figure 3:
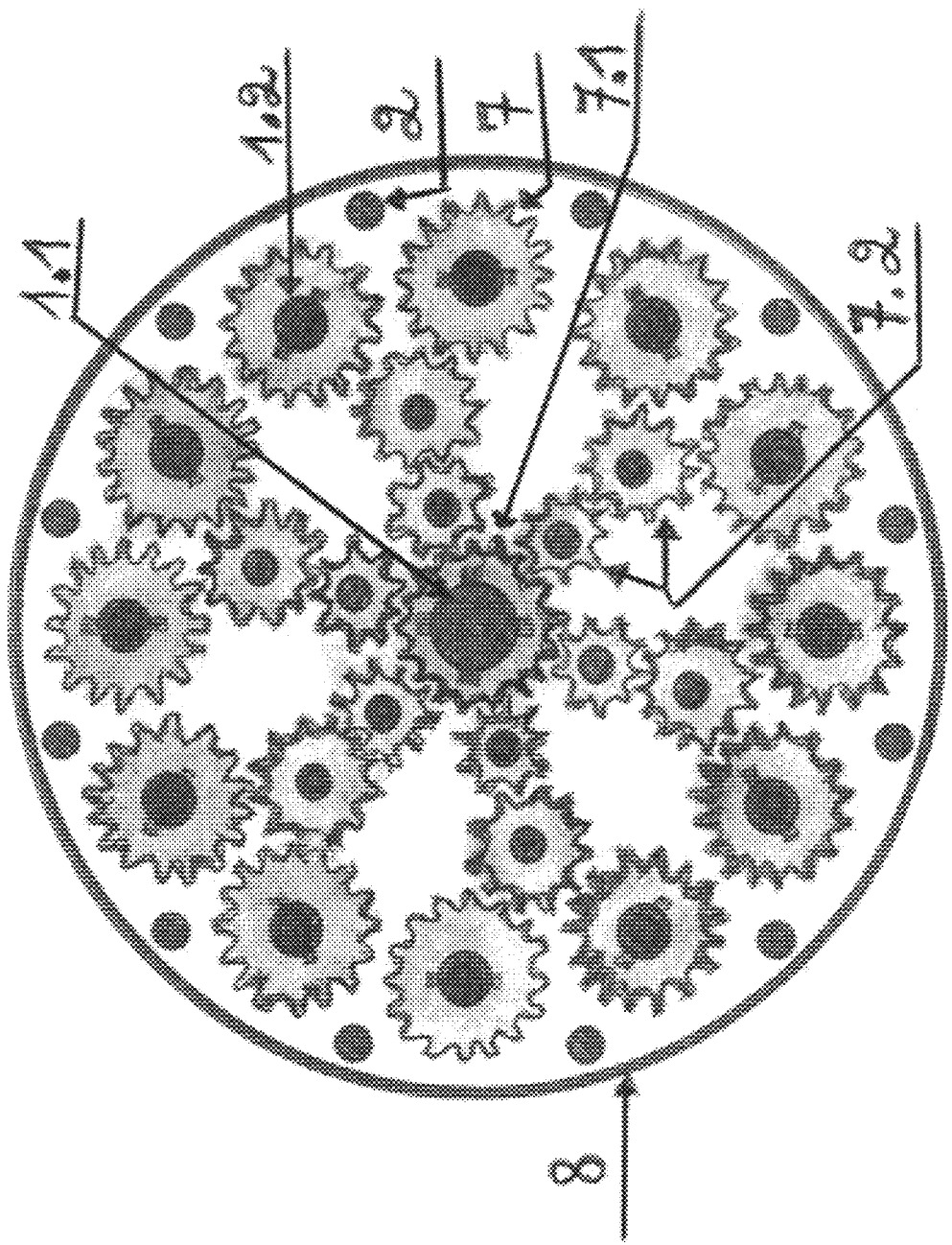
FIG. 3 illustrates the formation of synchronization and transmission toothed gears:
1.1: rotor axis preferably in stainless steel;
1.2: peripheral axis preferably in stainless steel;
2: stability rod preferably in stainless steel;
7: synchronization gear carried by a peripheral axis;
7.1: synchronization gear carried by the rotor axis;
7.2: transmission gears;
8: engine frame.
Figures 4, 5:
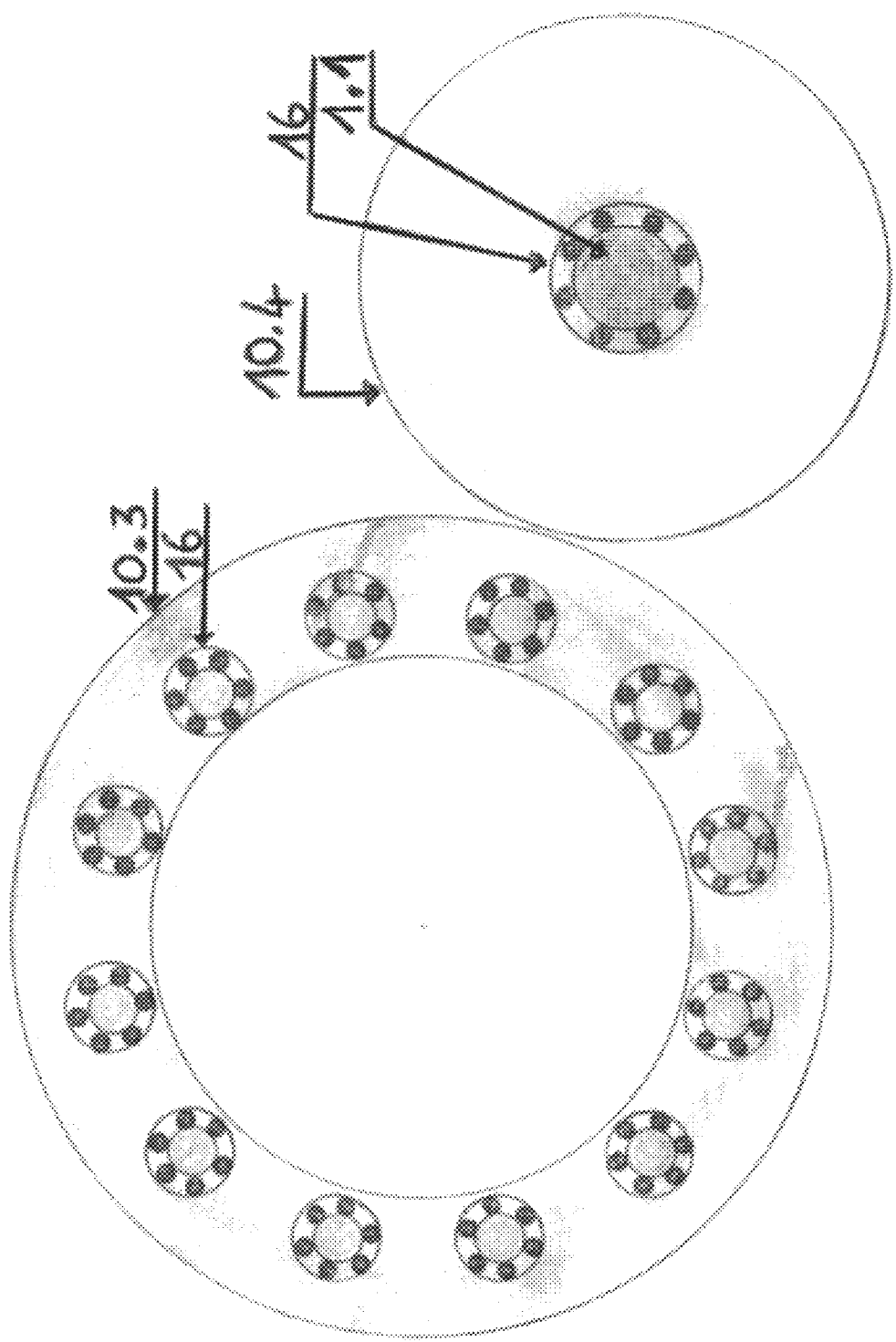
FIG. 4 is the illustration of the support of peripheral axes;
10.3: support,
16: roller.
FIG. 5 is the illustration of the support which holds the axis of the rotor:
1.1: rotor axis preferably in stainless steel;
10.4: support;
16: roller.
Figure 7:
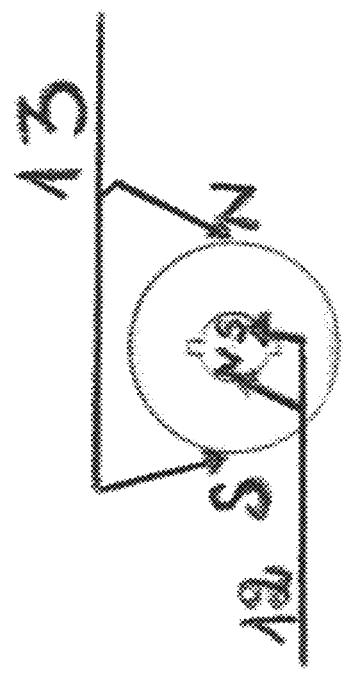
FIG. 7 is the example of a diametral type permanent magnet (this type can be used by the system):
12: two magnetic poles caused by the through bore of a permanent magnet;
13: two magnetic poles of a diametral type permanent magnet.
Figure 6:
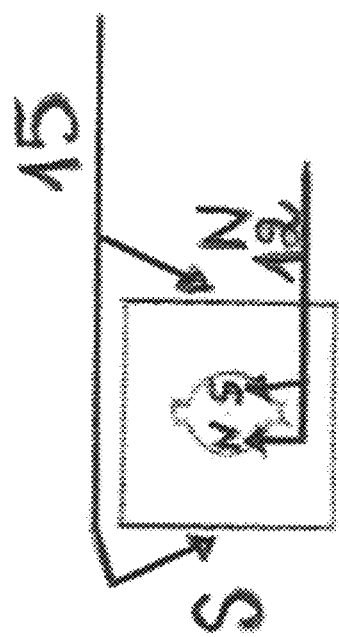
FIG. 6 is the example of an axial type permanent magnet (this type can be used by the system):
12: two magnetic poles caused by the through bore of a permanent magnet;
15: two magnetic poles of an axial type permanent magnet.

The system is composed of a set comprising: axes, permanent magnets (FIG. 2, (6), (6.1)) and synchronization toothed gears (FIG. 3, (7), (7.1)). Each axis (FIG. 3, (1.1), (1.2)) carries at the same time at least one permanent magnet and at least one synchronization toothed gear. One of the axes (FIG. 3, (1.1)) of this system takes a central position as the axis (FIG. 2, (1.1)) of the rotor (10), while the others serve as peripheral axes (FIG. 3, (1.2)).

This system also employs other toothed gears. They are in charge of the transmission (FIG. 3, (7.2)) between a synchronization toothed gear (FIG. 3, (7.1)) carried by the axis of the rotor and the synchronization toothed gears (FIG. 3, (7)) carried by the peripheral axes (FIG. 3, (1.2)). The synchronization toothed gears carried by the peripheral axes mesh one by one, or in pairs, with one of the transmission toothed gears. Another transmission toothed gear in turn meshes with the synchronization toothed gear carried by the rotor axis.

This axis is in central position (FIG. 3, (1.1)) carries an assembly composed of one or various permanent magnets (FIG. 2, (6.1)) and one or various synchronization toothed gears: this assembly represents the rotor (10). The other axes (FIG. 3, (1.2)) have a peripheral position around this rotor. The rotor axis has one or two coaxial outlets (FIG. 1, (1)) in order to release the driving force of the system.

All the toothed gears (of transmission and of synchronization) thus allow through these meshes to synchronize the rotary movement between at least one permanent magnet (FIG. 2, (6.1)) carried by the rotor axis and the permanent magnets carried by the peripheral axes.

Magnetic attraction and repulsion device for driving axes in rotation (FIG. 1, (11)), comprising an engine frame (8), supports (7.01), (8.01), (10.3) and (10.4), stability rod (2) transmission toothed gears (FIG. 3, (7.2)), magnetic field synchronization toothed gears (FIG. 1, (7)) and (FIG. 3, 7.1)), a number of permanent magnets units (FIG. 1, (6) and FIG. 2, (6.1)), carried respectively by the rotor axis (FIG. 2, (1.1)) and its peripheral axes (1.2), the control means (FIG. 1, (5)), the latters are external to the object of the invention and are needed along the circumference of the engine frame (8), the activity of the system can be realized from one or various magnetic poles of permanent magnets carried by the rotor axis, provided that this or these magnetic poles are directed respectively in alternation between two magnetic poles of permanent magnets carried by the peripheral axes or between four magnetic poles, including two magnetic poles caused by the through bore of the said permanent magnets carried by the peripheral axes, in order to produce mechanical work by the magnetic attraction and repulsion.

However, the magnetic poles caused by the through bore of the permanent magnets carried by the peripheral axes does not constitute any advantage or constraint to the activity of the system.

In order to control the continuous rotary movement of the permanent magnets (FIG. 2, (6), (6.1)) synchronized by the toothed gears (FIG. 3, (7), (7.1), (7.2)), the system (engine) uses means external to the object of the invention such as: control rings (FIG. 1, (5)) or a control stator. The rotary movement of this system being considerable, the control means engaged must meet their function of slowing down, accelerating or resting the engine.

The interaction of the magnetic fields of permanent magnets carried by peripheral axes does not present a constraint that can block the continuous activity of the system. Each constraint between fields of permanent magnets carried by peripheral axes is countered by its opposite. For example: a constraint of two magnetic fields (north, north) is countered by two other magnetic fields (south, north).

The interactions of the magnetic fields, which relate to the magnetic repulsion and attraction between the magnetic poles of permanent magnets carried by the peripheral axes and the magnetic poles of permanent magnets carried by the rotor axis, allow the magnetic poles of a permanent magnet carried by the rotor axis to alternate respectively from permanent magnet to permanent magnet carried by peripherals axes.

For example: if the south magnetic pole of a permanent magnet carried by the rotor axis (FIG. 2, (14)) is located between two magnetic poles of a permanent magnet carried by peripheral axis, it is repelled by the field of the same magnetic identity and at the same time it is attracted towards the field of the opposite identity belonging to the same permanent magnet carried by a peripheral axis. Once the south magnetic pole of the permanent magnet carried by the rotor axis is between two permanents magnets carried by the peripheral axes, the repulsion remains active with respect to the preceding permanent magnet, and at the same time the south magnetic pole of the permanent magnet carried by the rotor axis is attracted to the opposite identity of the next permanent magnet, so that the south magnetic pole of the permanent magnet carried by the rotor axis rotor is located between the other pair of poles belonging to the next permanent magnet. This alternating movement of the magnetic south pole of the permanent magnet carried by the rotor axis allows continuous activity within the engine frame (8).

If this movement is applied with only one magnetic pole (North or South) of a permanent magnet carried by the rotor axis, the other magnetic pole should be located near the axis of the rotor. In addition, a counterweight and permanent magnet holder must be provided.

However, the alternation is subject to a certain number of criteria such as:

The interactions of magnetic fields between the poles of one or various permanent magnets carried by the rotor axis and those carried by the peripheral axes are constantly kept in synchronization by toothed gears.

The contribution of this implication by the synchronization toothed gears allows to any intensity of the field of a magnetic pole of the permanent magnet carried by the rotor axis, a lesser force, and this, by the resistance of the fields relative to the poles of permanent magnets carried respectively by the peripheral axes (the speed of a magnetic pole of a permanent magnet carried by the rotor axis is higher than that of a magnetic pole of the permanent magnet carried by a peripheral axis).

However, this system must meet other criteria, such as:

Magnetic attraction and repulsion device for driving axes in rotation is designed so that the magnetic fields of the poles of one and of various permanent magnets carried by the peripheral axes exert a force of repulsion and attraction on one or various magnetic fields of the poles of permanent magnets carried by the rotor axis so as to alternate and produce a variation of the magnetic flux.

Magnetic attraction and repulsion device for driving axes in rotation is based on the involvement of synchronization toothed gears which ensures to the magnetic poles of permanent magnets carried by the rotor axis a speed of rotation preferably at least three times higher than the speed of the magnetic poles of any permanent magnet carried by a peripheral axis.

Magnetic attraction and repulsion device for driving axes in rotation requires that the diameter of the synchronization toothed gear carried by the rotor axis be preferably at least three times smaller than the diameter circumscribed by one or various permanent magnets carried by the rotor axis.

Among the criteria of the Magnetic attraction and repulsion device for driving axes in rotation, the diameter circumscribed by one or various permanent magnets carried by the rotor axis be preferably at least three times greater than the diameter of a permanent magnet carried by a peripheral axis.

The number of tours per minute of a permanent magnet carried by a peripheral axis may be greater than or equal to that of a permanent magnet carried by the axis of the rotor. This depends on the number of peripheral axes used by the system.

Magnetic attraction and repulsion device for driving axes in rotation, allows one or various permanent magnets carried by the rotor axis and those carried by the peripheral axes, the whole of which is synchronized by toothed gears within the engine frame, to take another geometric shape.

Magnetic attraction and repulsion device for driving axes in rotation, is a engine which uses controls means (external to the subject of the invention), such as an electromagnetic stator, or rings composed of other permanent magnets having magnetic field allowing it to control the slowing down, acceleration or resting of its synchronized rotation.

Magnetic attraction and repulsion device for driving axes in rotation is an engine which can produce a movement to a vehicle, a navigating craft, a propeller aircraft, an electric generator or a device to which the system can be applied.

In order to obtain a driving force required by a machine, the system offers the possibility that each axis carries a plurality of permanent magnets and/or the increase in the number of peripheral axes around the rotor.

Thus, the system of a magnetic attraction and repulsion device for driving axes in rotation is intended to produce a driving force released by one or two coaxial outlets thanks to a number of permanent magnets and synchronization toothed gears carried by an axis of the rotor and its peripheral axes around, these gears meshed by means of transmission toothed gears.

However, the practical reality of the system makes it possible for the latter to meet the quantum theory.

According to the present invention, the system of a magnetic attraction and repulsion device for driving axes in rotation can thus be presented under various modes of embodiment, arrangement and combination.

However, and regardless of the mode of embodiment, arrangement or combination of the system, it retains the same characteristic features of the system and cannot be out of the framework and scope of the present invention.

A basic model is proposed, the realization of which is conceived from a single production set (FIG. 1, (11)). It is composed essentially of permanent magnets aligned one by one around the rotor, a set of toothed gears and finally, a possible control means with ring (external to the subject of the invention). The other drawings (FIGS. 2-7) illustrate the system components.

The phases of mounting a basic model concerning the magnetic attraction and repulsion device for driving axes in rotation (FIG. 1, (11)), are as follows:

1. List the North (N) and the South (S), of all the permanent magnets (FIG. 2).
2. Place the toothed gears (FIG. 3, (7), (7.1) and (7.2)), their axes ((FIG. 3, (1.1) and (1.2)) and the rods (FIG. 3, (2)), between the support (7.01) and the support (8.01) within the engine frame (FIG. 1, (8)).
3. Place the permanent magnets carried by the peripherals axes according to the position north, south (FIG. 2, (6)), and place the support (FIG. 4, (10.3)).
4. Check the fluidity between the permanent magnets carried respectively by the peripheral axes.
5. Place the control means (FIG. 1, (5)) by changing the positioning of the permanent magnets put in maximal acceleration (FIG. 1, (4)). This change of positioning is achieved by moving one of the rings to resting position, (repositioning (3) on another peripheral magnet). This proceeding allows the blocking of the fluidity between permanent magnets carried by the peripheral axes.
6. Place the permanent magnet of the rotor (FIG. 2, (6.1)) and close the support (FIG. 5, (10.4)).

To activate the system, simply pull the acceleration cable (FIG. 1, (9)).

What is claimed is:

1. A magnetic attraction and repulsion device for driving axes in rotation, comprising an engine frame, supports, a stability rod, transmission toothed gears, magnetic field synchronization toothed gears, a first permanent magnet unit carried by a rotor axis, a plurality of second permanent magnet units carried by peripheral axes of the rotor axis, and a control means,
   wherein the peripheral axes are external to the magnetic attraction and repulsion device and are needed along a circumference of the engine frame, whereby an activity of a system is realized from one or more magnetic poles of the first permanent magnet unit carried by the rotor axis,
   wherein the one or more magnetic poles are directed respectively in alternation between two magnetic poles or between four magnetic poles of the plurality of second permanent magnet units carried by the peripheral axes, wherein the two magnetic poles and the four magnetic poles includes two magnetic poles caused by a through bore of the plurality of second permanent magnet units carried by the peripheral axes, in order to produce mechanical work by a magnetic attraction and repulsion.

2. The magnetic attraction and repulsion device according to claim 1, wherein magnetic fields of the two or four magnetic poles of the plurality of second permanent magnet units carried by the peripheral axes exert a force of repulsion and attraction on one or more magnetic fields of the one or more magnetic poles of the first permanent magnet unit carried by the rotor axis so as to alternate and produce a variation of a magnetic flux.

3. The magnetic attraction and repulsion device according to claim 2, wherein the magnetic field synchronization toothed gears ensure that the one or more magnetic poles of the first permanent magnet unit carried by the rotor axis has a speed of rotation at least three times higher than a speed of the two or four magnetic poles of the plurality of second permanent magnet units carried by the peripheral axes.

4. The magnetic attraction and repulsion device according to claim 3, wherein a diameter of the magnetic field synchronization toothed gear carried by the rotor axis is at least three times smaller than a diameter circumscribed by one or more of the first permanent magnet unit carried by the rotor axis.

5. The magnetic attraction and repulsion device according to claim 4, wherein the diameter circumscribed by the first permanent magnet unit carried by the axis of the rotor is at least three times greater than a diameter of any of the plurality of second permanent magnet units carried by the peripheral axes.

6. The magnetic attraction and repulsion device according to claim 5, wherein a number of tours per minute of any of the plurality of second permanent magnet units carried by the peripheral axes is greater than or equal to a number of tours per minute of first permanent magnet unit carried by the rotor axis.

7. The magnetic attraction and repulsion device according to claim 6, wherein one or more of the first permanent magnet unit carried by the rotor axis and the plurality of second permanent magnet units by the peripheral axes is synchronized by the magnetic field synchronization toothed gears within the engine frame to take a geometric shape.

8. Magnetic attraction and repulsion device for driving axes in rotation, according to claim 7, characterized in that the engine uses control means (external to the subject of the invention), such as an electromagnetic stator, or rings composed by other permanent magnets with a magnetic field allowing it to control the slowing down, acceleration or resting of its synchronized rotation.

9. Magnetic attraction and repulsion device for driving axes in rotation according to claim 8, characterized in that the engine can produce a movement to a vehicle, a navigating craft, a propeller aircraft, an electric generator or a device to which the system can be applied.

* * * * *